United States Patent Office 3,053,902
Patented Sept. 11, 1962

3,053,902
PREPARATION OF MERCAPTANS
Thomas F. Doumani, Whittier, Calif., assignor to Union Oil Company of California, Los Angeles, Calif., a corporation of California
No Drawing. Filed Sept. 20, 1957, Ser. No. 685,069
15 Claims. (Cl. 260—609A)

This invention relates to the preparation of lower aliphatic mercaptans by the interaction of lower alkanols with hydrogen sulfide at high temperatures and in the presence of certain alkaline catalysts. In particular it relates to the preparation of methyl mercaptan by the interaction of methanol with hydrogen sulfide. When these materials are reacted at temperatures between about 400° and 1200° F., several different reactions are possible. The present invention is directed primarily to the use of certain alkaline catalysts which are found to favor the production of mercaptans in preference to other possible side reactions. The invention also embraces the use of certain optimum proportions of reactants in conjunction with the specific class of catalysts described in order to facilitate the purification and recovery of the reaction products. The invention also includes other procedural details which will be more particularly described hereinafter.

The general reaction for producing mercaptans by the process herein described is as follows:

$$ROH + H_2S \rightleftharpoons RSH + H_2O + \Delta \tag{1}$$

Thio-ethers, or sulfides, are apparent produced primarily through the following reaction mechanism:

$$2ROH \rightleftharpoons ROR + H_2O + \Delta \tag{2}$$
$$ROR + H_2S \rightleftharpoons R_2S + H_2O + \Delta \tag{3}$$

Simultaneous reactions which may lead to the formation of either thio-ethers or mercaptans, depending upon the position of equilibrium, are as follows:

$$2ROH + H_2S \rightleftharpoons R_2S + 2H_2O + \Delta \tag{4}$$
$$2RSH \rightleftharpoons R_2S + H_2S + \Delta \tag{5}$$
$$RSH + ROH \rightleftharpoons R_2S + H_2O + \Delta \tag{6}$$

In addition to the above reactions other undesirable side reactions occur to a greater or lesser extent, which are relatively non-reversible under the reaction conditions described. Some of these side reactions are as follows, where the alcohol is methanol:

$$CH_3OH \rightarrow CO + 2H_2 - \Delta \tag{7}$$
$$CO + H_2O \rightarrow CO_2 + H_2 + \Delta \tag{8}$$
$$CH_3OH + CO \rightarrow CO_2 + CH_4 + \Delta \tag{9}$$

The general reaction set forth in Equation 1 above is well known. Sabatier (Comptes rendus 150, 1219) describes the reaction of methanol with hydrogen sulfide at 300–360° C. over a thoria catalyst to produce methyl mercaptan. The same reaction was also studied by Kramer et al. (J.A.C.S. 43, 880) employing butanol and methanol, a thoria catalyst and temperatures of about 380° C. Yields of mercaptan ranging between about 30 and 50% are reported. In each of the above references the molar ratio of hydrogen sulfide to alkanol was about 1 to 1. Subsequent patent literature discloses similar processes conducted in the presence of large excesses of hydrogen sulfide, and employing a variety of metal oxide catalysts.

From an inspection of the above Equations 1, 3, 5 and 6 it might be presumed that the net formation of sulfides could be repressed by employing in the reaction mixture a stoichiometric excess of hydrogen sulfide, or the organic sulfide $R_2S$. It has now been found however that the role of the catalyst in the above reactions is of such critical nature that certain of the above reactions may be almost entirely repressed by the use of specific catalysts tailored for the particular reaction desired. In employing these catalysts it is found that the initial proportion of reactants becomes a very minor consideration insofar as product distribution is concerned. In some cases the results to be theoretically expected from the use of an excess of alkanol, hydrogen sulfide, organic sulfide, or mercaptan are not obtained at all. It is found for example that if certain acidic, cracking type catalysts are employed such as silica-alumina the product obtained is almost entirely sulfide, even though an excess of hydrogen sulfide may be present in the initial reaction mixture. The substantially neutral catalysts such as alumina gel are found to promote both the mercaptan-forming reactions and the sulfide-forming reactions to a similar degree. When using such neutral catalysts it has been found feasible to shift the equilibrium of the reaction to obtain the desired product by adjusting the proportion of reactants employed. It has also been discovered that when alkaline catalysts are employed such as calcium oxide or sodium hydroxide the sulfide-forming reactions are almost entirely repressed, the product consisting almost entirely of mercaptan. And, as in the case of the acid catalysts, it has been found that the effect of the alkaline catalyst is so specific that it is not feasible to shift the equilibrium of the reaction to any appreciable degree by altering the molar proportion of reactants.

Another important consideration in reactions of the present nature revolves about the methods employed for driving the reaction to completion. It is of course customary in chemical reactions between two or more reactants to employ an excess of one of them in order that the reaction will rapidly go to completion and leave an excess of only one reactant. As indicated above it has been customary in the past, when it is desired to produce mercaptans from alcohols and hydrogen sulfide, to employ large excesses of hydrogen sulfide in order to repress the formation of sulfides. This excess of hydrogen sulfide also serves to favor the complete consumption of alcohol, leaving hydrogen sulfide as the excess reactant. Inasmuch as the reaction also produces small proportions of other gases such as hydrogen, carbon dioxide, carbon monoxide, methane, ethylene, etc., it is necessary to employ a gas purification system in order to recover the hydrogen sulfide for recycle. It would be highly desirable to operate the process without an excess of hydrogen sulfide, whereby the fixed gases, after being stripped of the condensable materials, could be simply vented from the system. In the present case it has been found that when using the alkaline catalysts described herein it is possible to employ a stoichiometric excess of alcohol without causing any appreciable increase in the formation of sulfides, even though all, or most of the hydrogen sulfide is consumed in the reaction.

From the above discussion it will be seen that the major objective of the process described herein is to provide certain catalysts which favor the formation of mercaptans in preference to sulfides.

Another objective is to provide catalysts which permit the use of an excess of alcohol without appreciably increasing the formation of sulfides, thereby accelerating completion of the reaction and simplifying the product separation and recovery system.

Another objective is to provide convenient methods for controlling the exothermic heat of reaction whereby the process may be operated adiabatically.

A further object is to provide reaction conditions which favor the formation of mercaptans, and exclude as far as possible the formation of decomposition products as shown in Equations 7, 8 and 9, and oxy-ethers as shown in Equation 2. These and other objects are achieved by the procedures hereinafter described.

The catalysts employed herein may consist of any organic or inorganic base, i.e. any material which forms with water a solution having a pH above 7, and preferably above 10. The inorganic bases employed consist primarily of the hydroxides, oxides, and basic salts of the alkali and alkaline earth metals. Examples of such alkalies include calcium oxide, magnesium oxide, beryllium oxide, strontium oxide, barium oxide, sodium hydroxide, potassium hydroxide, lithium hydroxide, sodium sulfide, potassium sulfide, calcium sulfide, magnesium sulfide, sodium carbonate, potassium carbonate, sodium silicate, tri-sodium phosphate, disodium phosphate, sodium aluminate, soda-lime and other similar materials. Ammonia may also be employed.

The organic bases which may be employed herein are primarily the amines, such as the alkyl amines, di-alkyl amines, alkanol amines, di-alkanol amines, the heterocyclic amines, etc. Specific examples of such amines include methyl amine, ethyl amine, diethylamine, propyl amine, butyl amine, dibutyl amine, triethyl amine, ethanolamine, diethanolamine, butanolamine, dibutanol amine, benzylamine, aniline, pyridine, methyl pyridines, dimethyl pyridines, trimethyl pyridines, quinoline, methyl quinolines and isoquinolines. Mixtures of any of the above classes of materials may also be employed.

The alkaline earth gases described above may be employed as such, in granular form if desired, e.g. granular calcium oxide or granular soda-lime. Alternatively, such materials may be compounded with other carrier materials such as natural clays and formed into pellets. In employing a carrier however, care should be taken to insure that sufficient of the alkaline material is compounded therewith to overcome any acidity which may be present in the carrier, e.g. that resulting from $SiO_2$ in natural clays.

In employing soluble, non-volatile alkalies such as the alkali metal salts or hydroxides, it is preferable to impregnate those materials on an inert carrier such for example as activated charcoal, sand, alumina, silica gel, clay sherds, pumice stone, Fuller's earth, bauxite, calcium carbonate, zeolites, coke, slags, etc. In this case also sufficient alkaline material should be present to overcome any original acidity of the supporting material. Sometimes the alkaline material to be impregnated will react with the carrier, for example alumina and silica will react with sodium hydroxide to form sodium aluminate and sodium silicate respectively. In such cases the mechanical strength of the catalyst pellets or particles may be destroyed by the impregnation. It is therefore preferable in such cases to employ an impregnating solution consisting of aqueous sodium silicate or sodium aluminate. Those skilled in the art will readily understand that many other impregnation, coprecipitation or solid compounding procedures could be employed for preparing mixtures of the above materials and any such procedure which results in a suitably alkaline catalyst is contemplated herein.

The water-soluble alkalies may also be employed in aqueous solutions, as for example 5% to 50% aqueous sodium hydroxide, potassium hydroxide, etc. In such cases the reaction is preferably conducted under super-atmospheric pressures e.g. 300–3000 p.s.i.g. in order to maintain the aqueous caustic in liquid phase, at the reaction temperature, and the gaseous reactants are bubbled through the liquid body of catalyst, or otherwise intimately contacted therewith. In operating by this procedure temperatures below the critical temperature of water (705.2° F.) should be observed.

In employing the above-described organic bases, or volatile inorganic bases such as ammonia, somewhat different procedures are required. The highly volatile bases such as methyl amine, ethyl amine and other lower amines, as well as ammonia, may be continuously recycled through the reactor after being separated from the products. In such cases the recycled base may usually be recovered from its mercaptide salt by heating or scrubbing the product with acid solutions. In the preferred method of utilizing organic bases however, a high boiling base such as ethanolamine (B.P. 342° F.), or diethanolamine (B.P. 514° F.) is employed which boils at a substantially higher temperature than the mercaptan being produced, and above the decomposition temperature of any mercaptide salts which may be formed. In such cases the product gases from the reaction zone may be partially condensed in order to continuously reflux the organic base back to the reaction zone. By using super-atmospheric pressure such bases may be maintained in the liquid phase at high temperatures in the reaction zone. In employing such organic bases the reaction zone may be filled with a suitable contact material such as porcelain chips, glass beads or other similar material.

Any suitable type of reactor may be employed in carrying out the process. For continuous operation a tubular type metal or ceramic reactor may be employed containing the desired catalyst, and with the reactants entering either at the top or bottom thereof. Since the reaction is exothermic the reaction products may be heat exchanged with the incoming feed materials in a manner well known to those skilled in the art. Heating or cooling devices may be included within the reactor although they are not ordinarily necessary if a suitable excess of alcohol is employed to absorb the heat of reaction. Pressure in the reaction zone may range between about 0 to 1000 p.s.i.g., and preferably between 0 and 300 p.s.i.g. The temperature should be maintained at between about 400° and 1200° F., preferably between about 500° and 950° F. Suitable contact times may range between about 0.005 second and 10 seconds.

The molar proportion of methanol employed may range between about 1 and 10 moles per mole of hydrogen sulfide, and preferably between about 1.5 and 7 moles. These proportions are sufficient to insure that at least a major proportion of the hydrogen sulfide can be reacted while producing a reaction mixture wherein the mole-ratio of mercaptan/sulfide is at least about 10/1. At the same time a product stream is produced from which the fixed gases may simply be vented after condensation of the liquid products. If the mole-ratio of alcohol/hydrogen sulfide in the feed is equal to at least about 64 divided by the molecular weight of the alcohol, the reaction temperature may be controlled adiabatically. This means that the adiabatic temperature rise resulting from the reaction will be not more than about 200° F.

The principal products from the reaction zone consist of mercaptan, water, and excess methanol. These materials may be substantially completely separated by distillation in most cases. However, in case azeotropes are formed other separation methods may be employed. Methanol does not form an azeotrope with water and hence may be easily separated therefrom by distillation. Any methyl sulfide which is formed may be conveniently distilled off as an azeotrope with methanol and separated by e.g. water washing, or the azeotrope may be recycled with the incoming feed material.

If higher temperatures are used, i.e. above about 900° F. a substantial amount of cracking is sometimes observed. This undesirable cracking may be repressed by including an inert diluent in the feed mixture such as steam, carbon dioxide, methane, methyl sulfide, etc. Also higher pressures tend to repress cracking and hence should be employed when higher temperatures are being utilized. These measures are especially desirable when alcohols higher than methanol are used.

The invention may perhaps be more readily understood from the following examples, which should however be considered as illustrative only.

*Example 1*

A mixture consisting of 1045 gms. (32.6 moles) of methanol and 204 gms. $H_2S$ (6.0 moles) was vaporized and passed through a 1-inch stainless steel tubular reactor packed with 200 ml. of unslaked calcium oxide in the form of 4–8 mesh granules. The average bed temperature was 808° F., pressure was atmospheric, and the total run length was one hour. The exit gases were condensed to give 1125 gms. of liquid product having the following composition:

| Component: | Mole percent |
|---|---|
| $CH_3OH$ | 77.0 |
| $CH_3SH$ | 7.08 |
| $H_2S$ | 6.25 |
| $(CH_3)_2O$ | 0.175 |
| $(CH_3)_2S$ | 0.123 |
| $(CH_3S)_2$ | 0.031 |
| $H_2O$ | 8.43 |
| $CO_2$ | 0.032 |
| $COS$ | 0.0049 |
| $CS_2$ | 0.0037 |
| $C_2H_4$ | 0.0103 |

The yield of methyl mercaptan from methanol, based on a carbon material balance of the make-gas, was 90.5%; the conversion of hydrogen sufide, based on a sulfur balance of the make-gas was 54.2%.

By doubling the reaction time in the above example, the hydrogen sulfide conversion rises to about 90% or higher, while the yield of mercaptan from methanol is only slightly reduced. Similar results may be achieved by increasing the reaction temperature to e.g. 900° F.

When the above example is repeated using ethanol as the feed, substantially the same 57.5/1 mole-ratio of ethanethiol/diethylsulfide is produced. The yield of ethanethiol from ethanol is reduced to about 75% however, as a result of increased cracking.

Example II

A mixture consisting of 384 gms. of methanol (11.97 moles) and 452 gms. of $H_2S$ (13.27 moles) was vaporized and passed through a 1-inch tubular reactor packed with 50 ml. of a synthetic, coprecipitated silica-alumina composite containing about 5% $SiO_2$, and impregnated thereon about 11% by weight of NaOH. The silica-alumina composite had been pelleted (⅛-inch pellets) and calcined at about 1500° F. for 6 hours prior to the impragnation with aqueous sodium hydroxide. The average bed temperature was 865° F., pressure was atmospheric, and the total run length was one hour. The exit gases were condensed to give 617.7 gms. of liquid product which was found to have the following composition:

| Component: | Mole percent |
|---|---|
| $CH_3OH$ | 35.5 |
| $CH_3SH$ | 18.5 |
| $H_2S$ | 21.7 |
| $(CH_3)_2O$ | 0.46 |
| $(CH_3)_2S$ | 1.36 |
| $H_2O$ | 21.7 |
| $CO_2$ | 0.295 |
| $CO$ | 0.464 | the yield of methyl mercaptan from methanol, based on a carbon material balance of the make-gas, was about 90%.

Example III

A mixture consisting of 192 gms. of methanol (6 moles) and 204 gms. of $H_2S$ (6.0 moles) was vaporized and passed through a 1-inch tubular reactor packed with 200 ml. of a magnesium hydroxide catalyst prepared by precipitating the hydroxide from aqueous solution, drying, pelleting (⅛-inch pellets) and calcining. The average bed temperature was 897° F., pressure was atmospheric and the total run length was one hour. The exit gases were condensed to give 358.4 gms. of liquid product having the following composition:

| Component: | Mole percent |
|---|---|
| $CH_3OH$ | 21.9 |
| $CH_3SH$ | 25.7 |
| $H_2S$ | 17.6 |
| $(CH_3)_2O$ | 0.409 |
| $(CH_3)_2S$ | 0.434 |
| $H_2O$ | 33.6 |
| $CO_2$ | 0.061 |
| $C_2H_4$ | 0.225 |

The yield of methyl mercaptan from methanol, based on a carbon material balance of the make-gas, was about 92%.

Example IV

A mixture consisting of 386 gms. of methanol (12 moles) and 450 gms. of $H_2S$ (13.2 moles) was vaporized and passed through a 1-inch tubular reactor packed with an alumina-silica-potassium hydroxide catalyst prepared in the same manner as the catalyst described in Example II, except that the impregnating solution was aqueous potassium hydroxide instead of sodium hydroxide. The finished catalyst contained 11% by weight of KOH. The average bed-temperature was 897° F., pressure was atmospheric and the total run length was one hour. The exit gases were condensed to give 646 gms. of liquid product having the following composition:

| Component: | Mole percent |
|---|---|
| $CH_3OH$ | 19.0 |
| $CH_3SH$ | 19.70 |
| $H_2S$ | 23.1 |
| $(CH_3)_2O$ | 0.284 |
| $(CH_3)_2S$ | 2.12 |
| $H_2O$ | 35.3 |
| $CO_2$ | 0.334 |
| $C_2H_4$ | 0.069 |

The yield of methyl mercaptan from methanol, based on a carbon material balance of the make-gas recovered, was 79%.

When this experiment is repeated using a 2/1 mole-ratio of methanol to $H_2S$, the mole-ratio of mercaptan/sulfide in the product is substantially unchanged, i.e. about 9/1.

Example V

This example shows the comparative effect of alkaline, neutral and acidic catalysts upon the relative proportions of mercaptan and sulfide which are formed.

Four different catalysts were prepared and tested in 100 ml. lots in a reactor similar to that described in Example I, and under the following operating conditions:

| | |
|---|---|
| Pressure | Atmospheric. |
| Temperature | 850–900° F. |
| Feed rate | 802 gms./hr. (2 gm. moles $CH_3OH$/hr.). |
| Feed composition | 20 mole percent $CH_3OH$, 80 mole percent $H_2S$. |

The catalysts tested were as follows:

*Catalyst A.*—A 95% alumina-5% silica gel composite prepared by coprecipitation of an aqueous mixture of sodium aluminate and sodium silicate with carbon dioxide. The precipitate was washed, dried at 90–110° C., activated by heating for two hours at 1100° F. and then formed into ⅛-inch pellets.

*Catalyst B.*—A substantially pure precipitated alumina gel, activated at about 1100° F. and formed into ⅛-inch pellets.

*Catalyst C.*—A synthetic, activated silica-alumina gel composite in the form of ⅛-inch pellets, containing about 85% by weight of silica.

*Catalyst D.*—Same as Catalyst C, except that the pellets were steamed for 48 hours at 1000° F. to reduce the destructive cracking centers.

The make-gases from the four runs were collected and analyzed as in the preceding examples. The mole-ratios of methyl mercaptan to methyl sulfide are tabulated below, along with the corresponding mole-ratios from Examples I, II, III and IV:

| Example | Catalyst | Relative pH | Mole ratio $CH_3SH/(CH_3)_2S$ |
|---|---|---|---|
| I | CaO | alkaline | 57.5 |
| II | NaOH | do | 12.6 |
| III | Mg(OH)$_2$ | do | 59.3 |
| IV | KOH | do | 9.30 |
| VA | Al$_2$O$_3$ | neutral | 4.89 |
| VB | Al$_2$O$_3$ | do | 5.55 |
| VC | SiO$_2$—Al$_2$O$_3$ | acid | 0.61 |
| VD | SiO$_2$—Al$_2$O$_3$ | do | 0.68 |

These results demonstrate clearly the remarkable selectivity of the alkaline catalysts disclosed herein for promoting mercaptan formation in preference to sulfides, even when the original mole ratio of alcohol to hydrogen sulfide is theoretically adverse (Ex. I).

*Example VI*

To illustrate the use of an organic base, a vaporous mixture of methanol and hydrogen sulfide in a molar proportion of about 5 to 1 is preheated to about 500° F. and bubbled slowly through liquid diethanolamine contained in a flask which is immersed in an oil bath maintained at 500° F. The product gases are removed through a reflux condenser maintained at 212° F. Upon condensation of the make-gases methyl mercaptan is obtained in about 95% yield. The conversion of hydrogen sulfide is only about 20% in this case, but may be substantially increased by increasing either the contact time or temperature.

*Example VII*

To illustrate the use of an aqueous alkali, a 20% solution of sodium hydroxide is first saturated with hydrogen sulfide and the resulting sodium hydrosulfide solution is then placed in a stainless steel pressure vessel equipped with inlet and outlet valves. The solution is heated to about 480° F. and an equi-molar mixture of gaseous hydrogen sulfide and methanol is passed through the solution. Upon condensation of the exit gases, good yields of methyl mercaptan are recovered.

Other lower aliphatic alcohols may be substituted in the foregoing examples with analogous results. Such alcohols include ethanol, n-propanol, isopropanol, butanol, isobutanol, pentanol, etc. Also, mixtures of any of the above alcohols may be employed to obtain mixtures of the corresponding mercaptans. The term "lower aliphatic alcohol," or "lower alkanol" as employed herein means any aliphatic hydroxy compound containing less than about 7 carbon atoms.

This application is a continuation-in-part of application Serial No. 349,957, filed April 20, 1953.

The foregoing disclosure is not to be considered as limiting the scope of the invention since many variations may be made by those skilled in the art without departing from the scope or spirit of the following claims.

I claim:

1. A process for preparing a lower alkyl mercaptan which comprises contacting a vaporous feed mixture comprising a lower alkanol and hydrogen sulfide with an alkaline catalyst at a temperature between about 400° and 1200° F., the mole-ratio of lower alkanol to hydrogen sulfide in said feed mixture being greater than 1, continuing said contacting for a sufficient length of time to consume at least a major portion of the hydrogen sulfide supplied, and recovering alkyl mercaptan from the reaction products, said catalyst comprising as its essential active component an alkaline material capable of forming with water a solution having a pH above about 10.

2. A process according to claim 1 wherein said catalyst is selected from the group consisting of the oxides, hydroxides, and alkaline salts of the alkali metals.

3. A process according to claim 1 wherein said alkaline catalyst is selected from the group consisting of the oxides, hydroxides and alkaline salts of the alkaline earth metals.

4. A process according to claim 1 wherein said catalyst is selected from the group consisting of ammonia and basic organic amines.

5. A process according to claim 1 wherein said catalyst is essentially calcium oxide.

6. A process according to claim 1 wherein said catalyst is essentially magnesium oxide.

7. A process according to claim 1 wherein said catalyst is essentially sodium hydroxide.

8. A process according to claim 1 wherein said catalyst is essentially potassium hydroxide.

9. A process as defined in claim 1 wherein said catalyst is diethanol amine.

10. A process as defined in claim 1 wherein the mole-ratio of alkanol to hydrogen sulfide is between about 1.5 and 7, and wherein said contacting is continued for a sufficient length of time to consume substantially all of the hydrogen sulfide supplied.

11. A process as defined in claim 10 wherein said lower alkanol is methanol.

12. An adiabatic process for preparing a lower alkyl mercaptan which comprises preheating a vaporous feed mixture comprising a lower alkanol and hydrogen sulfide to a temperature between about 400° and 1200° F., the mole-ratio of lower alkanol to hydrogen sulfide in said feed mixture being (1) between about 1 and 10, and (2) at least equal to the fraction: 64/M.W., where M.W. is the molecular weight of said lower alkanol; adiabatically contacting said preheated feed mixture with an alkaline catalyst for a sufficient length of time to consume at least a major portion of the hydrogen sulfide supplied, and recovering alkyl mercaptan from the reaction products, said catalyst comprising as its essential active component an alkaline material capable of forming with water a solution having a pH above about 10.

13. A process as defined in claim 12 wherein said lower alkanol is methanol.

14. A process according to claim 12 wherein said catalyst is selected from the group consisting of the oxides, hydroxides, and alkaline salts of the alkali metals.

15. A process according to claim 12 wherein said alkaline catalyst is selected from the group consisting of the oxides, hydroxides and alkaline salts of the alkaline earth metals.

References Cited in the file of this patent

UNITED STATES PATENTS

| 2,116,182 | Baur | May 3, 1938 |
| 2,820,060 | Folkins | Jan. 14, 1958 |